United States Patent
Jang et al.

(10) Patent No.: US 10,893,267 B2
(45) Date of Patent: Jan. 12, 2021

(54) METHOD FOR PROCESSING IMAGE ON BASIS OF INTRA-PREDICTION MODE AND APPARATUS THEREFOR

(71) Applicant: LG ELECTRONICS INC., Seoul (KR)

(72) Inventors: Hyeongmoon Jang, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/614,705

(22) PCT Filed: May 15, 2018

(86) PCT No.: PCT/KR2018/005573
§ 371 (c)(1),
(2) Date: Nov. 18, 2019

(87) PCT Pub. No.: WO2018/212569
PCT Pub. Date: Nov. 22, 2018

(65) Prior Publication Data
US 2020/0077093 A1    Mar. 5, 2020

Related U.S. Application Data

(60) Provisional application No. 62/506,617, filed on May 16, 2017.

(51) Int. Cl.
*H04N 19/117* (2014.01)
*H04N 19/159* (2014.01)
(Continued)

(52) U.S. Cl.
CPC ........ *H04N 19/117* (2014.11); *H04N 19/159* (2014.11); *H04N 19/593* (2014.11); *H04N 19/86* (2014.11)

(58) Field of Classification Search
None
See application file for complete search history.

(56) References Cited

U.S. PATENT DOCUMENTS 8,503,528 B2 * 8/2013 Grange ............. H04N 7/26335
375/240.13
10,045,042 B2 * 8/2018 Lee ....................... H04N 19/61
(Continued)

OTHER PUBLICATIONS

Search Report, Google.*

*Primary Examiner* — Mohammad J Rahman
(74) *Attorney, Agent, or Firm* — Dentons US LLP

(57) ABSTRACT

The present invention provides an image processing method on the basis of an intra prediction mode and an apparatus therefor. Specifically, a method for processing an image on the basis of an intra prediction mode may comprise the steps of: inducing a prediction mode applied to an intra prediction of a current block; determining whether a bi-directional intra prediction using reference samples located at both boundaries of the current block with respect to a prediction direction of the prediction mode is applied to the current block; and generating a prediction sample by using a reference sample neighboring the current block on the basis of the prediction mode, wherein when the bi-directional intra prediction is applied, boundary filtering for the current block is skipped.

10 Claims, 16 Drawing Sheets

(51) Int. Cl.
*H04N 19/593* (2014.01)
*H04N 19/86* (2014.01)

(56) References Cited

U.S. PATENT DOCUMENTS

| | | | | |
|---|---|---|---|---|
| 10,757,406 | B2 * | 8/2020 | Lee | H04N 19/11 |
| 2004/0005004 | A1 * | 1/2004 | Demos | H04N 19/182 |
| | | | | 375/240.08 |
| 2007/0274388 | A1 * | 11/2007 | Lee | H04N 19/577 |
| | | | | 375/240.13 |
| 2012/0140821 | A1 * | 6/2012 | Drugeon | H04N 19/11 |
| | | | | 375/240.12 |
| 2014/0072041 | A1 * | 3/2014 | Seregin | H04N 19/176 |
| | | | | 375/240.13 |
| 2014/0184740 | A1 * | 7/2014 | Zhang | H04N 19/159 |
| | | | | 348/43 |
| 2015/0146779 | A1 * | 5/2015 | Bang | H04N 19/82 |
| | | | | 375/240.12 |
| 2015/0264346 | A1 * | 9/2015 | Yamashita | H04N 19/157 |
| | | | | 375/240.02 |
| 2015/0288980 | A1 * | 10/2015 | Lee | H04N 19/13 |
| | | | | 375/240.16 |
| 2016/0105685 | A1 * | 4/2016 | Zou | H04N 19/44 |
| | | | | 375/240.12 |
| 2017/0310959 | A1 * | 10/2017 | Chen | H04N 19/11 |
| 2018/0220129 | A1 * | 8/2018 | Peng | H04N 19/154 |
| 2018/0343469 | A1 * | 11/2018 | Jin | H04N 19/59 |
| 2019/0068967 | A1 * | 2/2019 | Ikai | H04N 19/513 |
| 2019/0116381 | A1 * | 4/2019 | Lee | H04N 19/105 |
| 2019/0141318 | A1 * | 5/2019 | Li | H04N 19/159 |
| 2019/0158846 | A1 * | 5/2019 | Moon | H04N 19/176 |
| 2019/0222843 | A1 * | 7/2019 | Lee | H04N 19/119 |
| 2020/0137394 | A1 * | 4/2020 | Shih | H04N 19/149 |

\* cited by examiner

[FIG. 1]
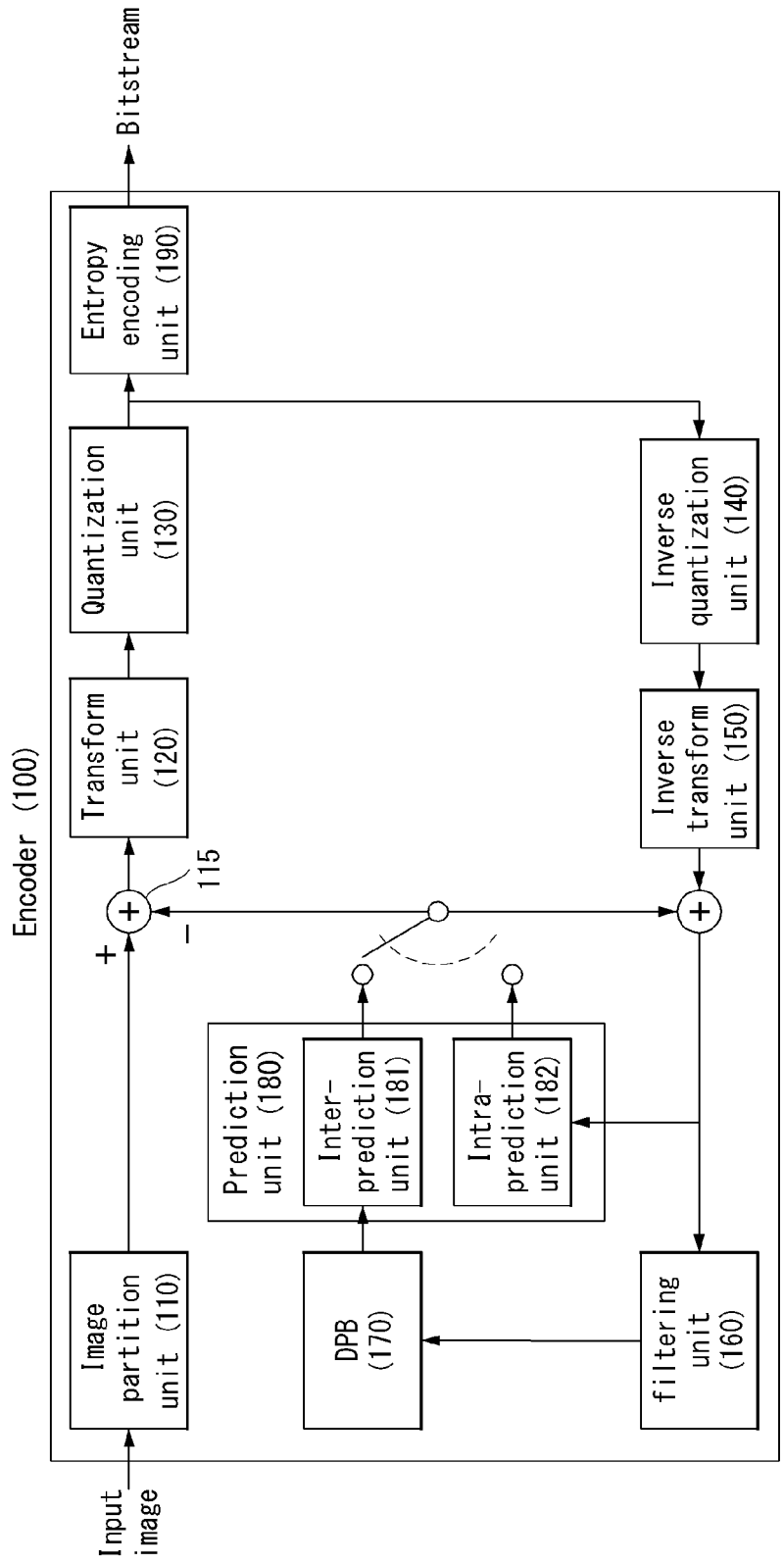

[FIG. 2]
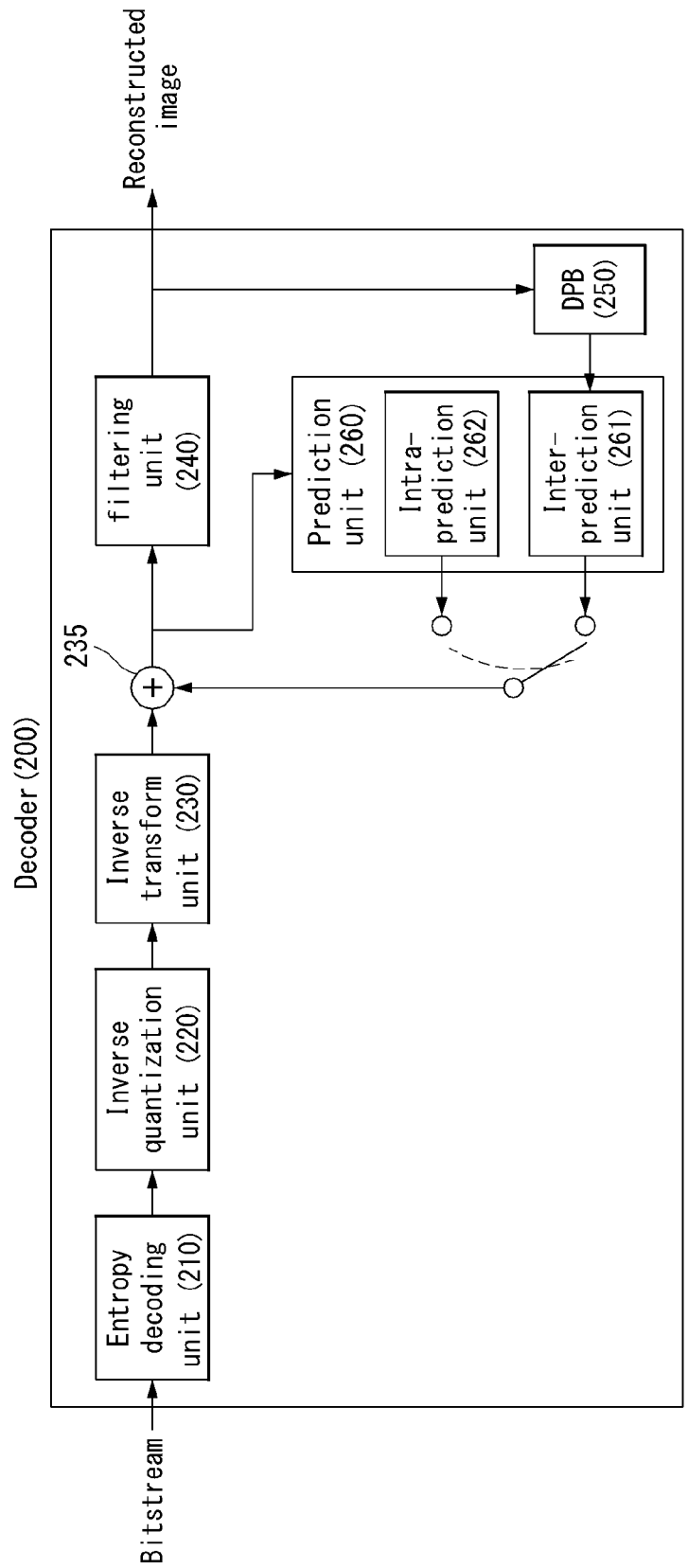

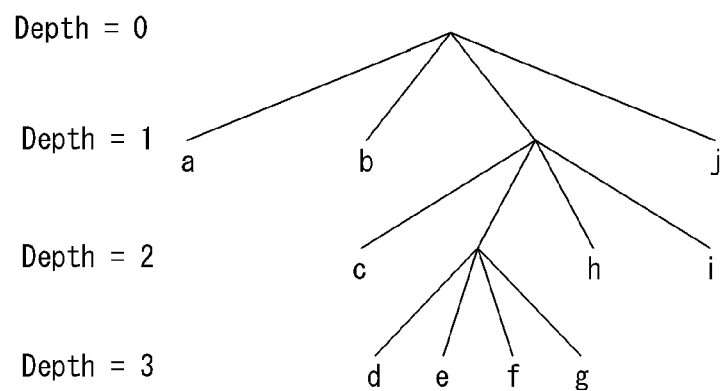
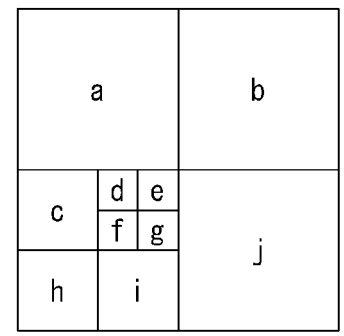
[FIG. 3A]     [FIG. 3B]

[FIG. 4]
Intra:
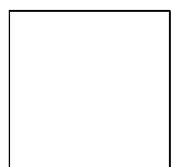 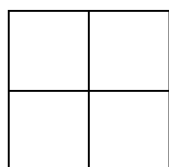
2Nx2N    NxN
Inter:
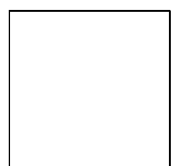 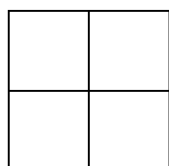 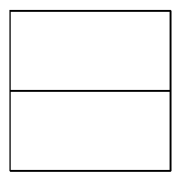 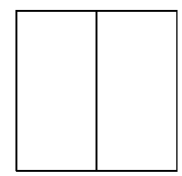
2Nx2N    NxN    2NxN    Nx2N
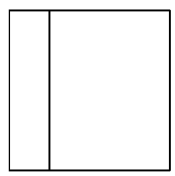 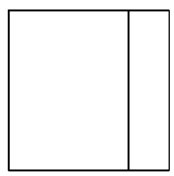 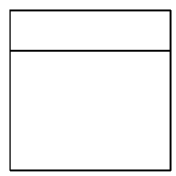 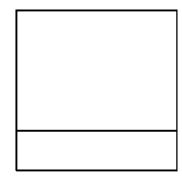
nLx2N    nRx2N    2NxnU    2NxnD

[FIG. 5]
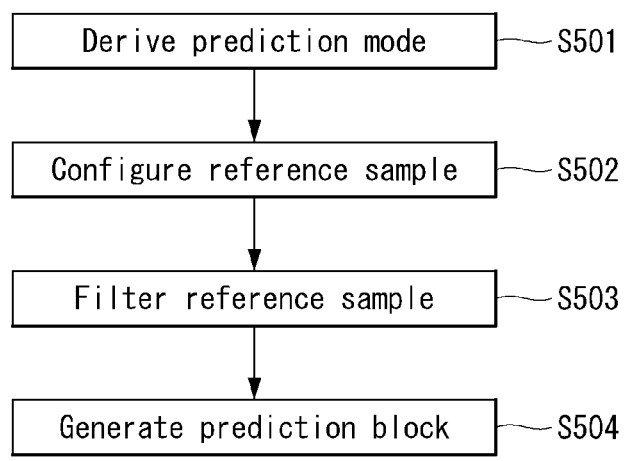

[FIG. 6]
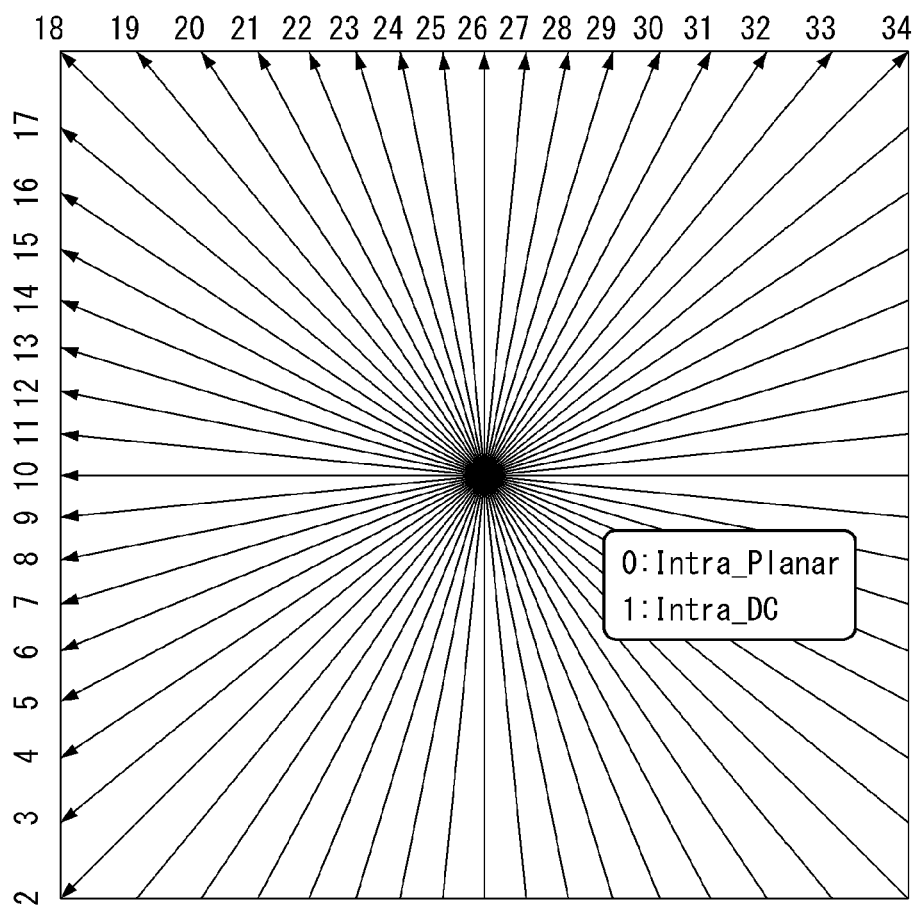

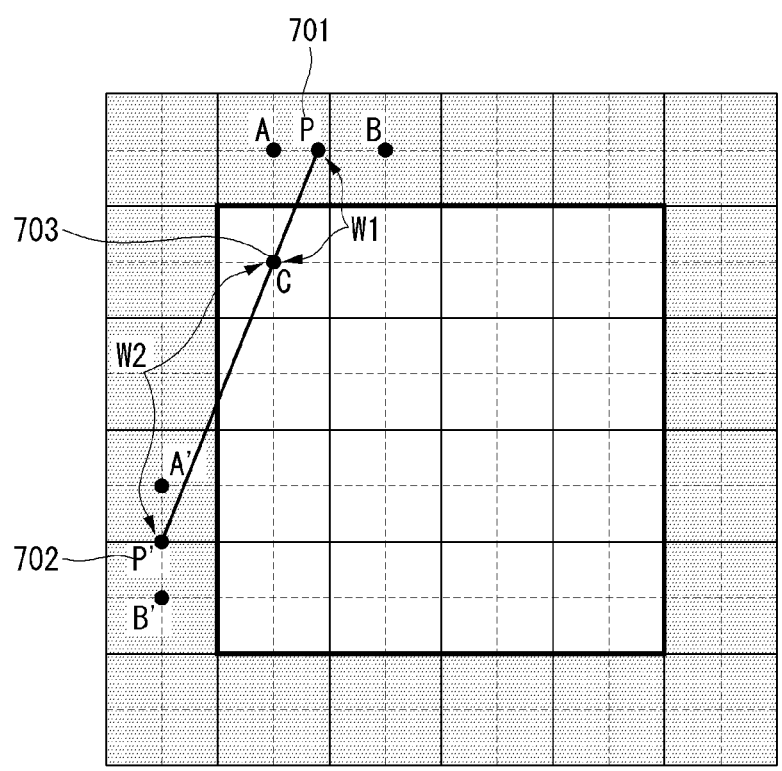
[FIG. 7]

[FIG. 8]
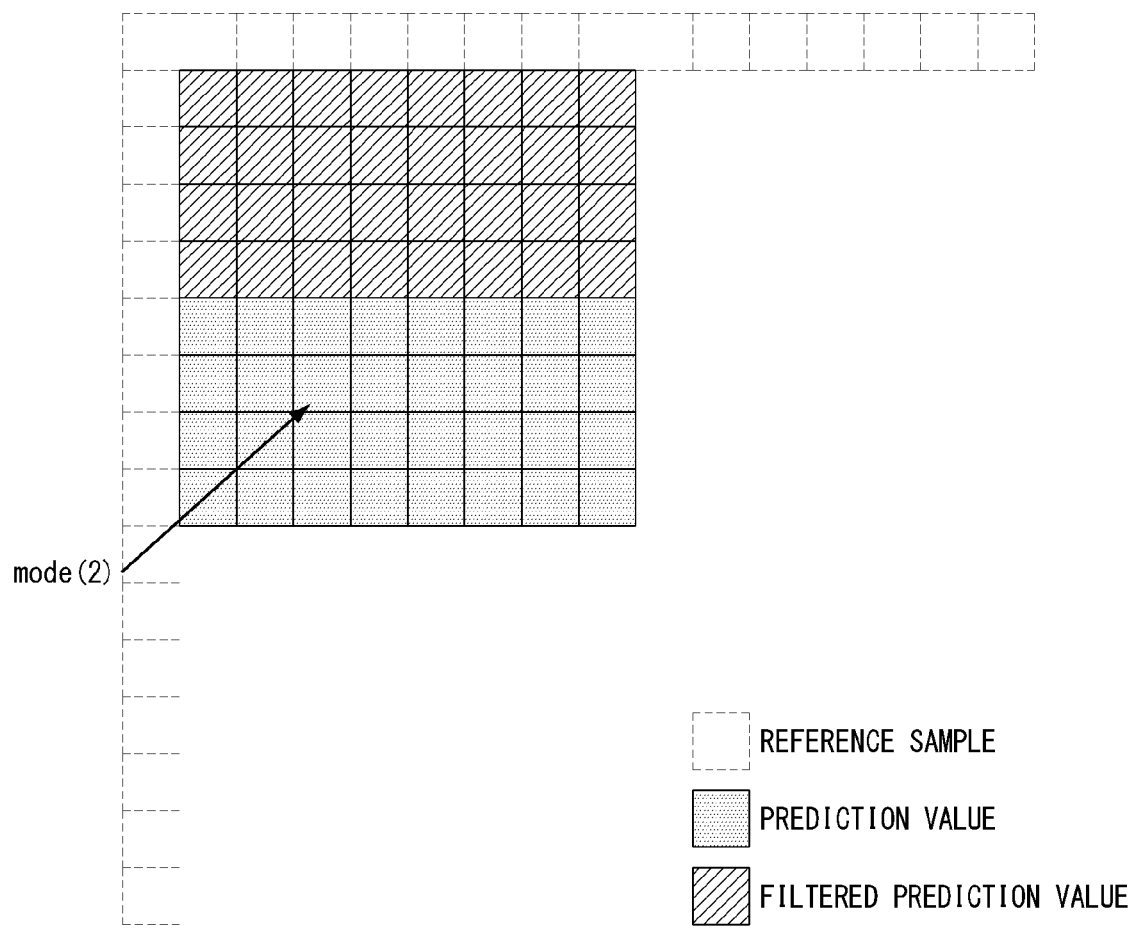

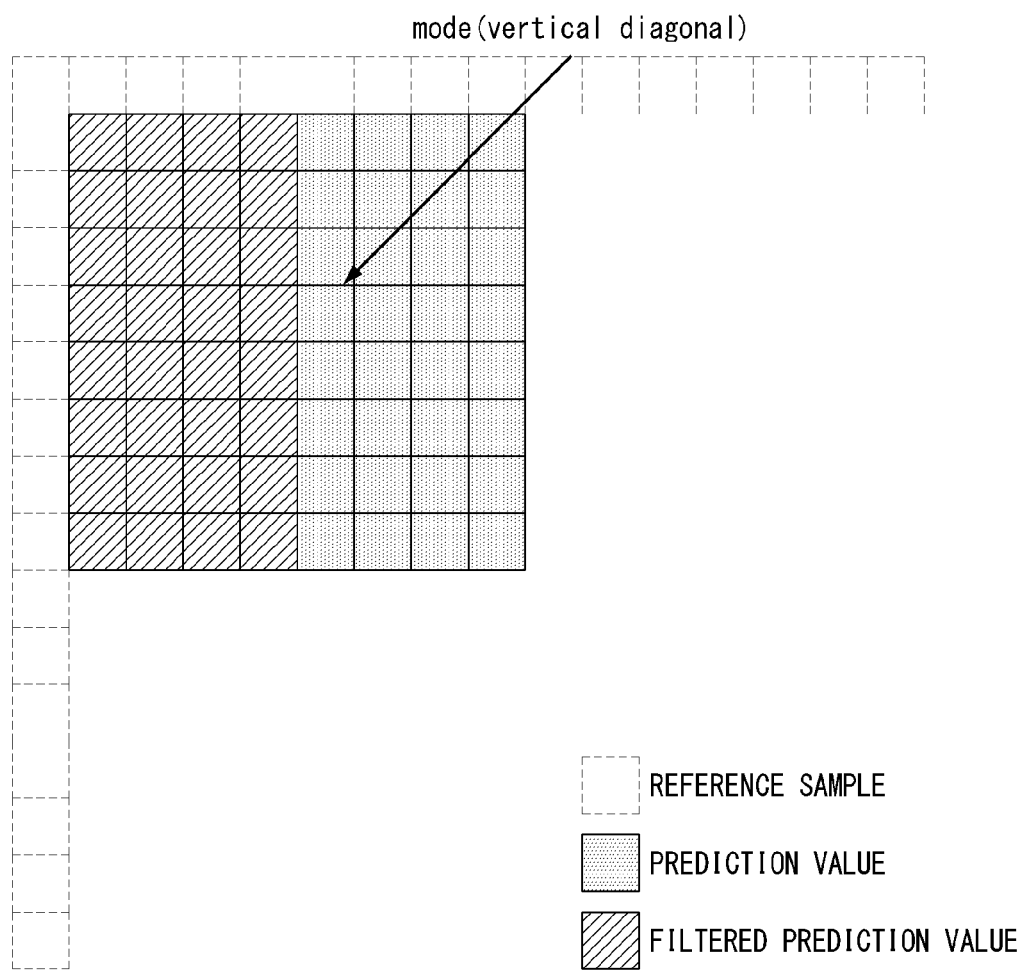

[FIG. 10]
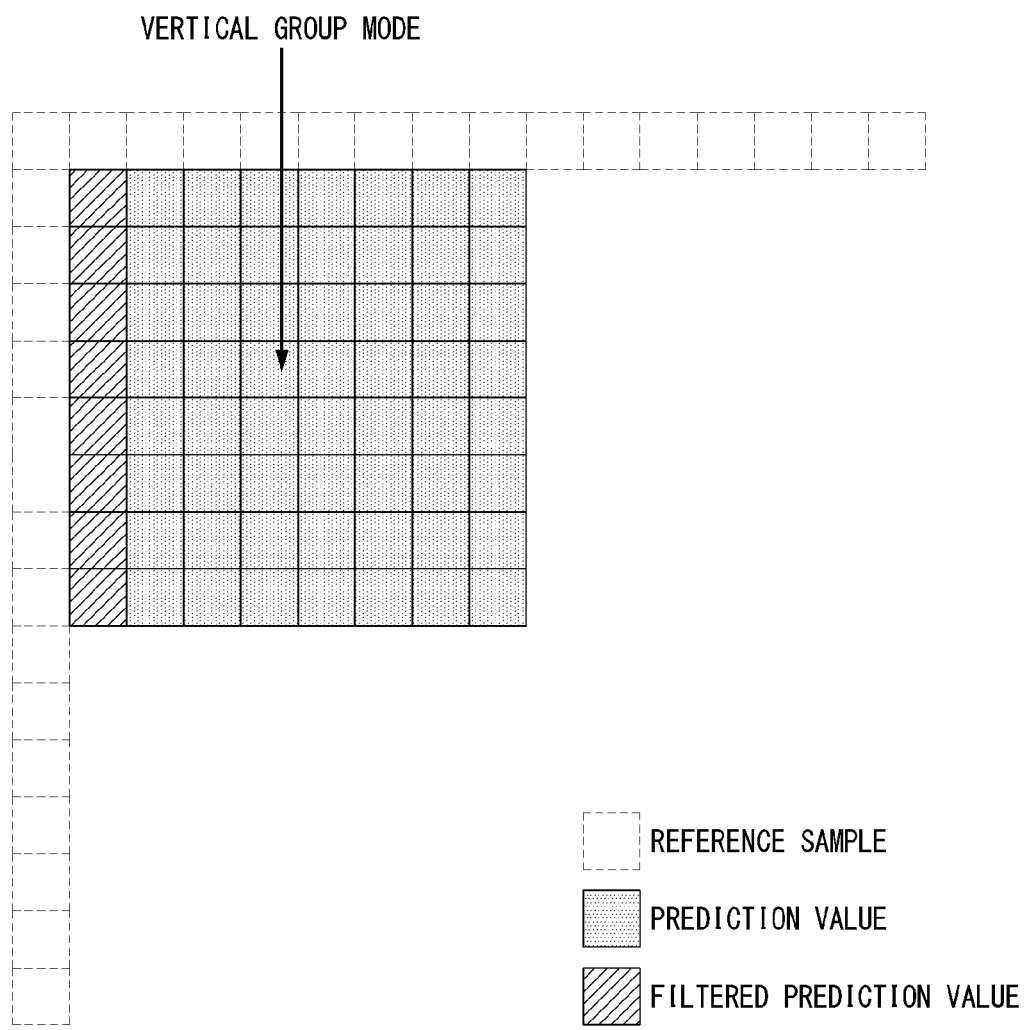

[FIG. 11]
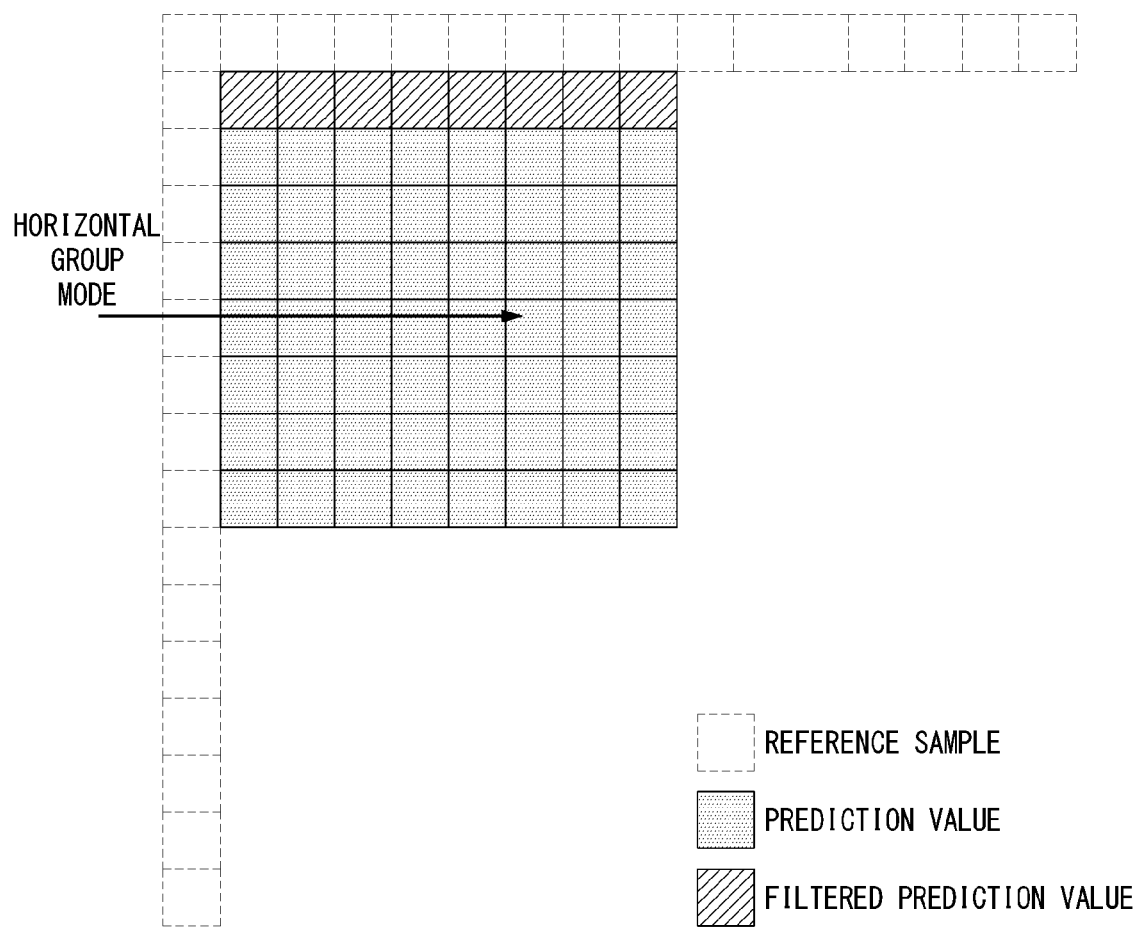

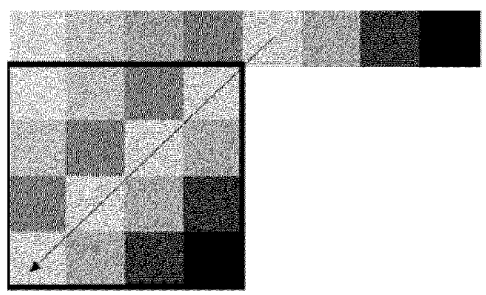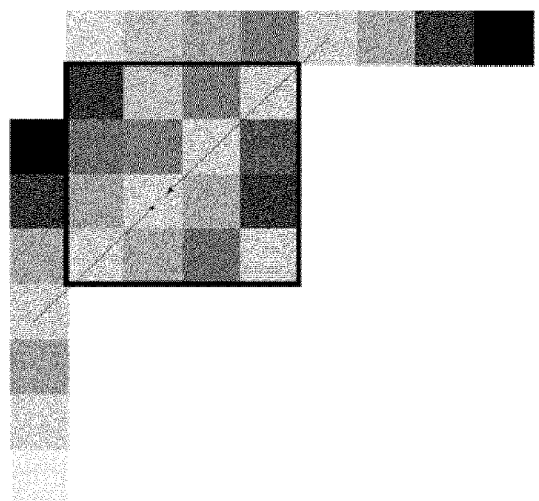
[FIG. 12A]　　　　　　　　　　　　[FIG. 12B]

[FIG. 13]
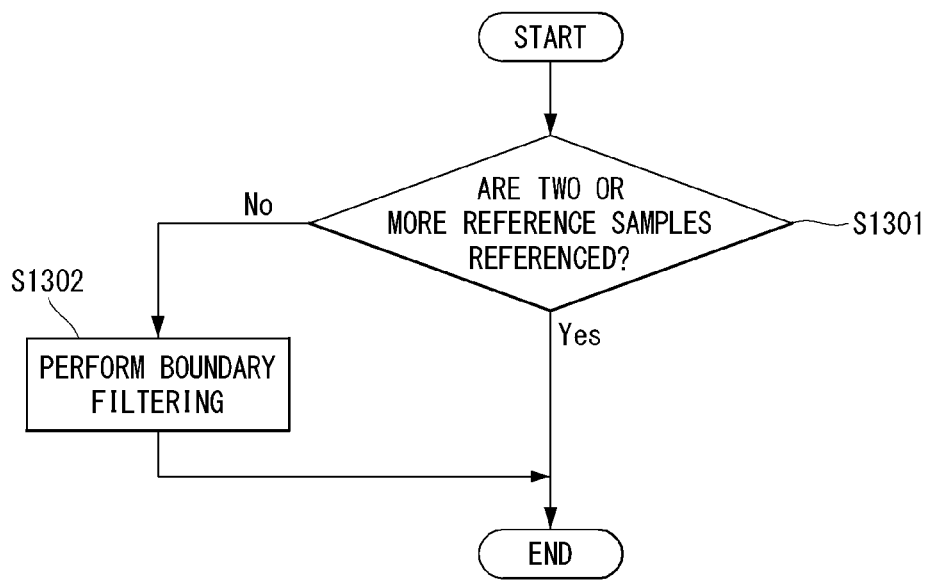

[FIG. 14]
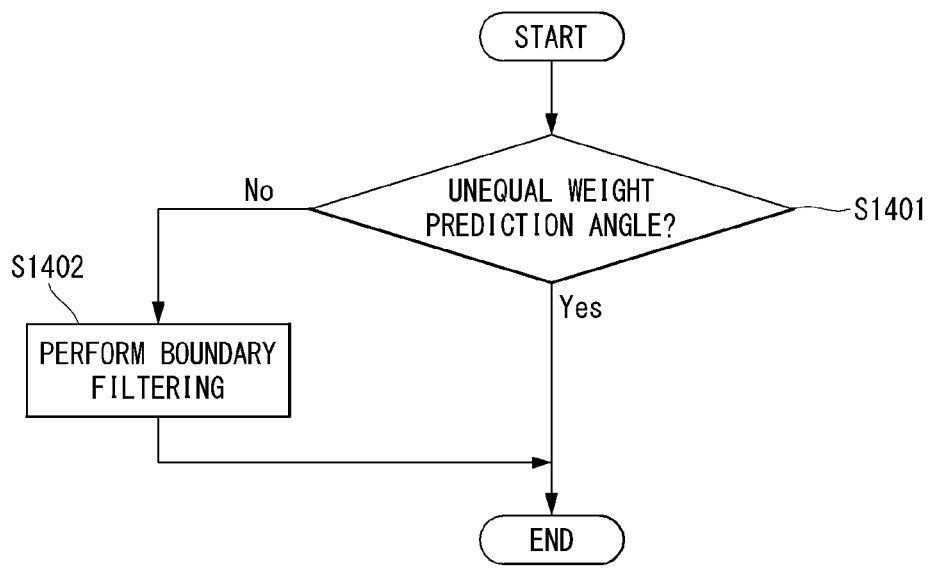

[FIG. 15]
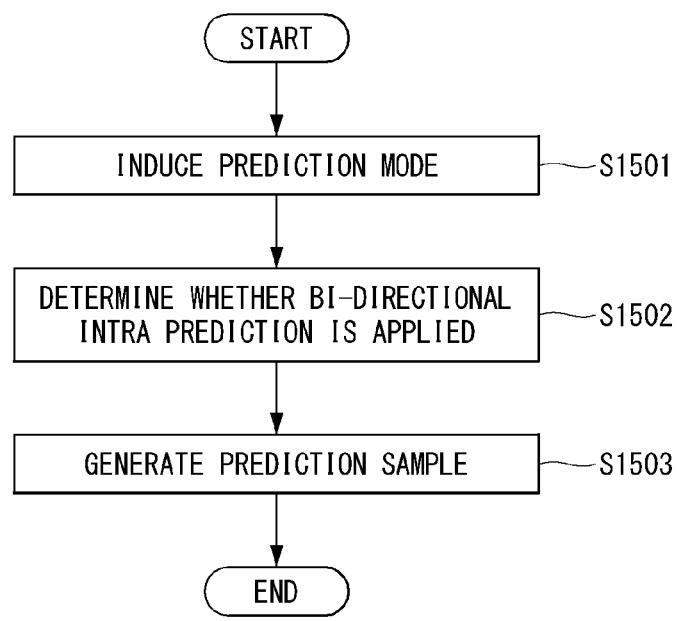

[FIG. 16]
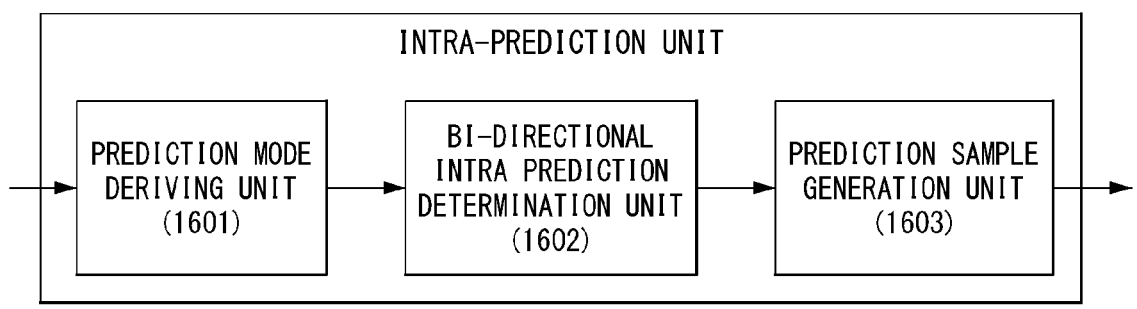

METHOD FOR PROCESSING IMAGE ON BASIS OF INTRA-PREDICTION MODE AND APPARATUS THEREFOR

CROSS-REFERENCE TO RELATED APPLICATIONS

This application is the National Stage filing under 35 U.S.C. 371 of International Application No. PCT/KR2018/005573, filed on May 15, 2018, which claims the benefit of U.S. Provisional Applications No. 62/506,617, filed on May 16, 2017, the contents of which are all hereby incorporated by reference herein in their entirety.

TECHNICAL FIELD

The present disclosure relates to a method for processing a still image or moving image and, more particularly, to a method for encoding/decoding a still image or moving image based on an intra-prediction mode and an apparatus supporting the same.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

Recently, various intra-prediction methods for generating a prediction sample with reference to two or more reference samples have been discussed, unlike the existing intra-prediction method (or an intra-prediction method) using only one reference sample.

As described above, even in the case of applying a method for generating a prediction block by referring to two or more reference samples and applying a weight to each reference sample, if boundary filtering for intra-prediction is performed, an excessive smoothing process may be performed on the block boundary to reduce the accuracy of the prediction.

An embodiment of the present disclosure provides a method for adaptively determining whether to apply boundary filtering according to an intra-prediction mode.

Furthermore, an embodiment of the present disclosure provides a method for adaptively applying boundary filtering to a generated prediction block when generating a prediction block using two or more weighted reference samples.

Objects of the present disclosure are not limited to the above-mentioned objects. That is, other objects that are not mentioned may be obviously understood by those skilled in the art to which the present disclosure pertains from the following description.

Technical Solution

Furthermore, in this specification, a method for processing an image based on an intra-prediction mode includes: deriving a prediction mode applied to an intra prediction of a current block; determining whether bi-directional intra-prediction using reference samples located on both sides of the current block based on a prediction direction of the prediction mode is applied to the current block; and generating a prediction sample using a reference sample neighboring the current block based on the prediction mode, wherein when the bi-directional intra prediction is applied, boundary filtering on the current block is skipped.

The generating of the prediction sample may include: deriving a first reference sample and a second reference sample used for the bi-directional intra prediction based on the prediction direction of the prediction mode when the bi-directional intra prediction is applied; and generating the prediction sample by weighting-sum the first reference sample and the second reference sample.

A weight applied to the first reference sample and the second reference sample, respectively, may be determined in proportion to a distance from a current pixel.

When the bi-directional intra prediction is not applied, uni-directional intra prediction using one reference sample may be applied to the current block.

The method may further include: performing boundary filtering on the current block by using at least one horizontal or vertical pixel line in the current block determined according to the prediction direction of the prediction mode when the bi-directional intra prediction is not applied.

Furthermore, in this specification, an apparatus for processing an image based on an intra-prediction mode includes: a prediction mode deriving unit configured to derive a prediction mode applied to an intra prediction of a current block; a bi-directional intra-prediction determination unit configured to determine whether bi-directional intra-prediction using reference samples located on both sides of the current block based on a prediction direction of the prediction mode is applied to the current block; and a prediction sample generation unit configured to generate a prediction sample using a reference sample neighboring the current block based on the prediction mode, in which when the bi-directional intra prediction is applied, boundary filtering on the current block is skipped.

The prediction sample generation unit may derive a first reference sample and a second reference sample used for the bi-directional intra prediction based on the prediction direction of the prediction mode when the bi-directional intra prediction is applied, and generate the prediction sample by weighting-sum the first reference sample and the second reference sample.

A weight applied to the first reference sample and the second reference sample, respectively, may be determined in proportion to a distance from a current pixel.

When the bi-directional intra prediction is not applied, uni-directional intra prediction using one reference sample may be applied to the current block.

The apparatus may further include: a boundary filtering unit configured to perform boundary filtering on on the current block by using at least one horizontal or vertical pixel line in the current block determined according to the prediction direction of the prediction mode when the bi-directional intra prediction is not applied.

Advantageous Effects

According to an embodiment of the present disclosure, it is possible to improve the accuracy of prediction by generating the prediction sample by linearly interpolating the plurality of reference samples based on the intra-prediction mode.

In addition, according to an embodiment of the present disclosure, it is possible to reduce the prediction error and improve the compression performance by applying a weight according to the distance between the current sample and the reference sample.

In addition, according to an embodiment of the present disclosure, it is possible to prevent excessive smoothing from being performed on the prediction block and to increase the compression efficiency by adaptively determining whether or not to apply the boundary filtering according to the intra-prediction mode.

In addition, according to an embodiment of the present disclosure, it is possible to skip the boundary filtering on the generated prediction block, reduce the complexity of the operation, and increase the prediction performance when generating a prediction block using two or more weighted reference samples.

Effects which can be achieved by the present disclosure are not limited to the above-mentioned effects. That is, other objects that are not mentioned may be obviously understood by those skilled in the art to which the present disclosure pertains from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

FIG. 1 illustrates a schematic block diagram of an encoder in which the encoding of a still image or video signal is performed, as an embodiment to which the present disclosure is applied.

FIG. 2 illustrates a schematic block diagram of a decoder in which decoding of a still image or video signal is performed, as an embodiment to which the present disclosure is applied.

FIG. 3 is a diagram for describing a split structure of a coding unit that may be applied to the present disclosure.

FIG. 4 is a diagram for describing a prediction unit that may be applied to the present disclosure.

FIG. 5 is an embodiment to which the present disclosure is applied and is a diagram illustrating an intra-prediction method.

FIG. 6 illustrates a prediction direction according to an intra-prediction mode.

FIG. 7 is a diagram for describing a linear interpolation prediction method as an embodiment to which the present disclosure may be applied.

FIG. 8 is a diagram illustrating an intra boundary filtering method according to a prediction mode according to an embodiment to which the present disclosure may be applied.

FIG. 9 is a diagram illustrating an intra boundary filtering method according to a prediction mode according to an embodiment to which the present disclosure may be applied.

FIG. 10 is a diagram illustrating an intra boundary filtering method according to a prediction mode according to an embodiment to which the present disclosure may be applied.

FIG. 11 is a diagram illustrating an intra boundary filtering method according to a prediction mode according to an embodiment to which the present disclosure may be applied.

FIG. 12 is a diagram for describing an intra boundary filtering method according to the embodiment of the present disclosure.

FIG. 13 is a diagram illustrating a method for adaptively applying boundary filtering according to an embodiment of the present disclosure.

FIG. 14 is a diagram illustrating a method for adaptively applying boundary filtering according to an embodiment of the present disclosure.

FIG. 15 is a diagram illustrating an intra-prediction mode based linear interpolation prediction method according to an embodiment of the present disclosure.

FIG. 16 is a diagram illustrating in detail an intra-prediction unit according to an embodiment of the present disclosure.

MODE FOR DISCLOSURE

Hereinafter, a preferred embodiment of the present disclosure will be described by reference to the accompanying drawings. The description that will be described below with the accompanying drawings is to describe exemplary embodiments of the present disclosure, and is not intended to describe the only embodiment in which the present disclosure may be implemented. The description below includes particular details in order to provide perfect understanding of the present disclosure. However, it is understood that the present disclosure may be embodied without the particular details to those skilled in the art.

In some cases, in order to prevent the technical concept of the present disclosure from being unclear, structures or devices which are publicly known may be omitted, or may be depicted as a block diagram centering on the core functions of the structures or the devices.

Further, although general terms widely used currently are selected as the terms in the present disclosure as much as possible, a term that is arbitrarily selected by the applicant is used in a specific case. Since the meaning of the term will be clearly described in the corresponding part of the description in such a case, it is understood that the present disclosure will not be simply interpreted by the terms only used in the description of the present disclosure, but the meaning of the terms should be figured out.

Specific terminologies used in the description below may be provided to help the understanding of the present disclosure. Furthermore, the specific terminology may be modified into other forms within the scope of the technical concept of the present disclosure. For example, a signal, data, a sample, a picture, a frame, a block, etc may be properly replaced and interpreted in each coding process.

Hereinafter, in this specification, a "processing unit" means a unit in which an encoding/decoding processing process, such as prediction, transform and/or quantization, is performed. Hereinafter, for convenience of description, a processing unit may also be called a "processing block" or "block."

A processing unit may be construed as having a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as being a unit for a luma component or a unit for a chroma component. For example, the processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the present disclosure is not limited thereto, and a processing unit may be construed as a meaning including a unit for a luma component and a unit for a chroma component.

Furthermore, a processing unit is not essentially limited to a square block and may be constructed in a polygon form having three or more vertices.

Furthermore, hereinafter, in this specification, a pixel, a picture element, etc. are collectively called a sample. Furthermore, to use a sample may mean to use a pixel value, a picture element value or the like.

FIG. 1 is illustrates a schematic block diagram of an encoder in which the encoding of a still image or video signal is performed, as an embodiment to which the present disclosure is applied.

Referring to FIG. 1, the encoder 100 may include a video split unit 110, a subtractor 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter-prediction unit 181 and an intra-prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., by the inter-prediction unit 181 or the intra-prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate transform coefficients by performing transform using a prediction mode applied to the residual block and a transform scheme determined based on the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal outputted by the quantization unit 130 may be used to generate a prediction signal. For example, a residual signal may be reconstructed by applying dequatization and inverse transformation to the quantized signal through the dequantization unit 140 and the inverse transform unit 150. A reconstructed signal may be generated by adding the reconstructed residual signal to the prediction signal output by the inter-prediction unit 181 or the intra-prediction unit 182.

Meanwhile, during such a compression process, neighbor blocks are quantized by different quantization parameters. Accordingly, an artifact in which a block boundary is shown may occur. Such a phenomenon is referred to a blocking artifact, which is one of important factors for evaluating image quality. In order to decrease such an artifact, a filtering process may be performed. Through such a filtering process, the blocking artifact is removed and the error of a current picture is decreased at the same time, thereby improving image quality.

The filtering unit 160 applies filtering to the reconstructed signal, and outputs it through a playback device or transmits it to the decoded picture buffer 170. The filtered signal transmitted to the decoded picture buffer 170 may be used as a reference picture in the inter-prediction unit 181. As described above, an encoding rate as well as image quality can be improved using the filtered picture as a reference picture in an inter-picture prediction mode.

The decoded picture buffer 170 may store the filtered picture in order to use it as a reference picture in the inter-prediction unit 181.

The inter-prediction unit 181 performs temporal prediction and/or spatial prediction with reference to the reconstructed picture in order to remove temporal redundancy and/or spatial redundancy. In this case, a blocking artifact or ringing artifact may occur because a reference picture used to perform prediction is a transformed signal that experiences quantization or dequantization in a block unit when it is encoded/decoded previously.

Accordingly, in order to solve performance degradation attributable to the discontinuity of such a signal or quantization, signals between pixels may be interpolated in a sub-pixel unit by applying a low pass filter to the inter-prediction unit 181. In this case, the sub-pixel means a virtual pixel generated by applying an interpolation filter, and an integer pixel means an actual pixel that is present in a reconstructed picture. A linear interpolation, a bi-linear interpolation, a wiener filter, and the like may be applied as an interpolation method.

The interpolation filter may be applied to the reconstructed picture, and may improve the accuracy of prediction. For example, the inter-prediction unit 181 may perform prediction by generating an interpolation pixel by applying the interpolation filter to the integer pixel and by using the interpolated block including interpolated pixels as a prediction block.

The intra-prediction unit 182 predicts a current block with reference to samples neighboring the block that is now to be encoded. The intra-prediction unit 182 may perform the following procedure in order to perform intra-prediction. First, the intra-prediction unit 182 may prepare a reference sample necessary to generate a prediction signal. Furthermore, the intra-prediction unit 182 may generate a prediction signal using the prepared reference sample. Furthermore, the intra-prediction unit 182 may encode a prediction mode. In this case, the reference sample may be prepared through reference sample padding and/or reference sample filtering. A quantization error may be present because the reference sample experiences the prediction and the reconstruction process. Accordingly, in order to reduce such an error, a reference sample filtering process may be performed on each prediction mode used for the intra-prediction.

The prediction signal (or prediction block) generated through the inter-prediction unit 181 or the intra-prediction unit 182 may be used to generate a reconstructed signal (or reconstructed block) or may be used to generate a residual signal (or residual block).

FIG. 2 illustrates a schematic block diagram of a decoder in which decoding of a still image or video signal is performed, as an embodiment to which the present disclosure is applied.

Referring to FIG. 2, the decoder 200 may include an entropy decoding unit 210, a dequantization unit 220, an inverse transform unit 230, an adder 235, a filtering unit 240, a decoded picture buffer (DPB) 250 and a prediction unit 260. Furthermore, the prediction unit 260 may include an inter-prediction unit 261 and an intra-prediction unit 262.

Furthermore, a reconstructed video signal output through the decoder 200 may be played back through a playback device.

The decoder 200 receives a signal (i.e., bit stream) output by the encoder 100 shown in FIG. 1. The entropy decoding unit 210 performs an entropy decoding operation on the received signal.

The dequantization unit 220 obtains transform coefficients from the entropy-decoded signal using quantization step size information.

The inverse transform unit 230 obtains a residual signal (or residual block) by inverse transforming the transform coefficients by applying an inverse transform scheme.

The adder 235 adds the obtained residual signal (or residual block) to the prediction signal (or prediction block) output by the prediction unit 260 (i.e., the inter-prediction unit 261 or the intra-prediction unit 262), thereby generating a reconstructed signal (or reconstructed block).

The filtering unit 240 applies filtering to the reconstructed signal (or reconstructed block) and outputs the filtered signal to a playback device or transmits the filtered signal to the decoded picture buffer 250. The filtered signal transmitted to the decoded picture buffer 250 may be used as a reference picture in the inter-prediction unit 261.

In this specification, the embodiments described in the filtering unit 160, inter-prediction unit 181 and intra-prediction unit 182 of the encoder 100 may be identically applied to the filtering unit 240, inter-prediction unit 261 and intra-prediction unit 262 of the decoder, respectively.

In particular, the intra-prediction unit 262 according to the present disclosure may perform the intra-prediction on the current block by linearly interpolating prediction sample values generated based on the intra-prediction mode of the current block. A detailed description of the intra-prediction unit 262 will be described later.

In general, a block-based image compression method is used in the compression technique (e.g., HEVC) of a still image or a video. The block-based image compression method is a method for processing an image by splitting it into specific block units, and may decrease memory use and a computational load.

FIG. 3 is a diagram for describing a split structure of a coding unit which may be applied to the present disclosure.

An encoder splits a single image (or picture) into coding tree units (CTUs) of a quadrangle form, and sequentially encodes the CTUs one by one according to raster scan order.

In HEVC, a size of CTU may be determined as one of 64×64, 32×32, and 16×16. The encoder may select and use the size of a CTU based on resolution of an input video signal or the characteristics of input video signal. The CTU includes a coding tree block (CTB) for a luma component and the CTB for two chroma components that correspond to it.

One CTU may be split in a quad-tree structure. That is, one CTU may be split into four units each having a square form and having a half horizontal size and a half vertical size, thereby being capable of generating coding units (CUs). Such splitting of the quad-tree structure may be recursively performed. That is, the CUs are hierarchically split from one CTU in the quad-tree structure.

A CU means a basic unit for the processing process of an input video signal, for example, coding in which intra/inter-prediction is performed. A CU includes a coding block (CB) for a luma component and a CB for two chroma components corresponding to the luma component. In HEVC, a CU size may be determined as one of 64×64, 32×32, 16×16, and 8×8.

Referring to FIG. 3, the root node of a quad-tree is related to a CTU. The quad-tree is split until a leaf node is reached. The leaf node corresponds to a CU.

This is described in more detail. The CTU corresponds to the root node and has the smallest depth (i.e., depth=0) value. A CTU may not be split depending on the characteristics of an input video signal. In this case, the CTU corresponds to a CU.

A CTU may be split in a quad-tree form. As a result, lower nodes, that is, a depth 1 (depth=1), are generated. Furthermore, a node (i.e., leaf node) that belongs to the lower nodes having the depth of 1 and that is no longer split corresponds to a CU. For example, in FIG. 3(b), a CU(a), a CU(b) and a CU(j) corresponding to nodes a, b and j have been once split from the CTU, and have a depth of 1.

At least one of the nodes having the depth of 1 may be split in a quad-tree form. As a result, lower nodes having a depth 1 (i.e., depth=2) are generated. Furthermore, a node (i.e., leaf node) that belongs to the lower nodes having the depth of 2 and that is no longer split corresponds to a CU. For example, in FIG. 3(b), a CU(c), a CU(h) and a CU(i) corresponding to nodes c, h and i have been twice split from the CTU, and have a depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a CU(d), a CU(e), a CU(f) and a CU(g) corresponding to nodes d, e, f and g have been three times split from the CTU, and have a depth of 3.

In the encoder, a maximum size or minimum size of a CU may be determined based on the characteristics of a video image (e.g., resolution) or by considering the encoding rate. Furthermore, information about the maximum or minimum size or information capable of deriving the information may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents a split count and/or degree of a CU, it may include information about the size of a CU.

Since the LCU is split in a Quad-tree shape, the size of SCU may be obtained by using a size of LCU and the maximum depth information. Or, inversely, the size of LCU may be obtained by using a size of SCU and the maximum depth information of the tree.

For a single CU, the information (e.g., a split CU flag (split_cu_flag)) that represents whether the corresponding CU is split may be forwarded to the decoder. This split information is included in all CUs except the SCU. For example, when the value of the flag that represents whether to split is '1', the corresponding CU is further split into four CUs, and when the value of the flag that represents whether to split is '0', the corresponding CU is not split any more, and the processing process for the corresponding CU may be performed.

As described above, a CU is a basic unit of the coding in which the intra-prediction or the inter-prediction is performed. The HEVC splits the CU in a prediction unit (PU) for coding an input video signal more effectively.

A PU is a basic unit for generating a prediction block, and even in a single CU, the prediction block may be generated in different way by a unit of PU. However, the intra-prediction and the inter-prediction are not used together for the PUs that belong to a single CU, and the PUs that belong to a single CU are coded by the same prediction method (i.e., the intra-prediction or the inter-prediction).

A PU is not split in the Quad-tree structure, but is split once in a single CU in a predetermined shape. This will be described by reference to the drawing below.

FIG. 4 is a diagram for describing a prediction unit that may be applied to the present disclosure.

A PU is differently split depending on whether the intra-prediction mode is used or the inter-prediction mode is used as the coding mode of the CU to which the PU belongs.

FIG. 4(a) illustrates a PU if the intra-prediction mode is used, and FIG. 4(b) illustrates a PU if the inter-prediction mode is used.

Referring to FIG. 4(a), assuming that the size of a single CU is 2N×2N (N=4, 8, 16 and 32), the single CU may be split into two types (i.e., 2N×2N or N×N).

In this case, if a single CU is split into the PU of 2N×2N shape, it means that only one PU is present in a single CU.

Meanwhile, if a single CU is split into the PU of N×N shape, a single CU is split into four PUs, and different prediction blocks are generated for each PU unit. However, such PU splitting may be performed only if the size of CB for the luma component of CU is the minimum size (i.e., the case that a CU is an SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in the intra-prediction, the PU split of N×N shape may be performed only if the size of CB for the luma component of CU is the minimum size (i.e., the case that a CU is an SCU).

The inter-prediction supports the PU split in the shape of 2N×N that is split in a horizontal direction and in the shape of N×2N that is split in a vertical direction.

In addition, the inter-prediction supports the PU split in the shape of nL×2N, nR×2N, 2N×nU and 2N×nD, which is an asymmetric motion split (AMP). In this case, 'n' means ¼ value of 2N. However, the AMP may not be used if the CU to which the PU is belonged is the CU of minimum size.

In order to encode the input video signal in a single CTU efficiently, the optimal split structure of the coding unit (CU), the prediction unit (PU) and the transform unit (TU) may be determined based on a minimum rate-distortion value through the processing process as follows. For example, as for the optimal CU split process in a 64×64 CTU, the rate-distortion cost may be calculated through the split process from a CU of 64×64 size to a CU of 8×8 size. The detailed process is as follows.

1) The optimal split structure of a PU and TU that generates the minimum rate distortion value is determined by performing inter/intra-prediction, transformation/quantization, dequantization/inverse transformation and entropy encoding on the CU of 64×64 size.

2) The optimal split structure of a PU and TU is determined to split the 64×64 CU into four CUs of 32×32 size and to generate the minimum rate distortion value for each 32×32 CU.

3) The optimal split structure of a PU and TU is determined to further split the 32×32 CU into four CUs of 16×16 size and to generate the minimum rate distortion value for each 16×16 CU.

4) The optimal split structure of a PU and TU is determined to further split the 16×16 CU into four CUs of 8×8 size and to generate the minimum rate distortion value for each 8×8 CU.

5) The optimal split structure of a CU in the 16×16 block is determined by comparing the rate-distortion value of the 16×16 CU obtained in the process 3) with the addition of the rate-distortion value of the four 8×8 CUs obtained in the process 4). This process is also performed for remaining three 16×16 CUs in the same manner.

6) The optimal split structure of CU in the 32×32 block is determined by comparing the rate-distortion value of the 32×32 CU obtained in the process 2) with the addition of the rate-distortion value of the four 16×16 CUs that is obtained in the process 5). This process is also performed for remaining three 32×32 CUs in the same manner.

7) Finally, the optimal split structure of CU in the 64×64 block is determined by comparing the rate-distortion value of the 64×64 CU obtained in the process 1) with the addition of the rate-distortion value of the four 32×32 CUs obtained in the process 6).

In the intra-prediction mode, a prediction mode is selected as a PU unit, and prediction and reconstruction are performed on the selected prediction mode in an actual TU unit.

A TU means a basic unit in which actual prediction and reconstruction are performed. A TU includes a transform block (TB) for a luma component and a TB for two chroma components corresponding to the luma component.

In the example of FIG. 3, as in an example in which one CTU is split in the quad-tree structure to generate a CU, a TU is hierarchically split from one CU to be coded in the quad-tree structure.

TUs split from a CU may be split into smaller and lower TUs because a TU is split in the quad-tree structure. In HEVC, the size of a TU may be determined to be as one of 32×32, 16×16, 8×8 and 4×4.

Referring back to FIG. 3, the root node of a quad-tree is assumed to be related to a CU. The quad-tree is split until a leaf node is reached, and the leaf node corresponds to a TU.

This is described in more detail. A CU corresponds to a root node and has the smallest depth (i.e., depth=0) value. A CU may not be split depending on the characteristics of an input video. In this case, the CU corresponds to a TU.

A CU may be split in a quad-tree form. As a result, lower nodes having a depth 1 (depth=1) are generated. Furthermore, a node (i.e., leaf node) that belongs to the lower nodes having the depth of 1 and that is no longer split corresponds to a TU. For example, in FIG. 3(b), a TU(a), a TU(b) and a TU(j) corresponding to the nodes a, b and j are once split from a CU and have a depth of 1.

At least one of the nodes having the depth of 1 may be split in a quad-tree form again. As a result, lower nodes having a depth 2 (i.e., depth=2) are generated. Furthermore, a node (i.e., leaf node) that belongs to the lower nodes having the depth of 2 and that is no longer split corresponds to a TU. For example, in FIG. 3(b), a TU(c), a TU(h) and a TU(i) corresponding to the node c, h and I have been split twice from the CU and have the depth of 2.

Furthermore, at least one of the nodes having the depth of 2 may be split in a quad-tree form again. As a result, lower nodes having a depth 3 (i.e., depth=3) are generated. Furthermore, a node (i.e., leaf node) that belongs to the lower nodes having the depth of 3 and that is no longer split corresponds to a CU. For example, in FIG. 3(b), a TU(d), a TU(e), a TU(f) and a TU(g) corresponding to the nodes d, e, f and g have been three times split from the CU and have the depth of 3.

A TU having a tree structure may be hierarchically split with predetermined maximum depth information (or maximum level information). Furthermore, each spit TU may have depth information. The depth information may include information about the size of the TU because it indicates the split number and/or degree of the TU.

Information (e.g., a split TU flag "split_transform_flag") indicating whether a corresponding TU has been split with respect to one TU may be transferred to the decoder. The split information is included in all of TUs other than a TU of a minimum size. For example, if the value of the flag indicating whether a TU has been split is "1", the corresponding TU is split into four TUs. If the value of the flag indicating whether a TU has been split is "0", the corresponding TU is no longer split.

Prediction

In order to reconfigure a current processing unit on which decoding is performed, a decoded part of a current picture or other pictures including the current processing unit may be used.

A picture (slice) using only a current picture for reconstruction, that is, on which only intra-prediction is performed, may be called an intra picture or I picture (slice). A picture (slice) using a maximum of one motion vector and reference index in order to predict each unit may be called a predictive picture or P picture (slice). A picture (slice) using a maximum of two motion vectors and reference indices may be called a bi-predictive picture or B picture (slice).

Intra-prediction means a prediction method for deriving a current processing block from a data element (e.g., a sample value) of the same decoded picture (or slice). That is, intra-prediction means a method for predicting a pixel value of a current processing block with reference to reconstructed areas within a current picture.

Inter-prediction means a prediction method for deriving a current processing block based on a data element (e.g., a sample value or a motion vector) of a picture other than a current picture. That is, inter-prediction means a method for predicting a pixel value of a current processing block with reference to reconstructed areas within another reconstructed picture other than a current picture.

Hereinafter, intra-prediction (or prediction within frame) is described more specifically.

Intra-Prediction (or Prediction within Frame)

FIG. 5 is an embodiment to which the present disclosure is applied and is a diagram illustrating an intra-prediction method.

Referring to FIG. 5, the decoder derives an intra-prediction mode of a current processing block (S501).

Intra-prediction may have a prediction direction for the position of a reference sample used for prediction depending on a prediction mode. An intra-prediction mode having a prediction direction is referred to as an intra-angular prediction mode (Intra Angular prediction mode). In contrast, an intra-prediction mode not having a prediction direction includes an intra planar (INTRA PLANAR) prediction mode and an intra DC (INTRA_DC) prediction mode.

Table 1 illustrates intra-prediction modes and associated names, and FIG. 6 illustrates a prediction direction according to an intra-prediction mode.

TABLE 1

| INTRA-PREDICTION MODE | ASSOCIATED NAMES |
| --- | --- |
| 0 | Intra-planar (INTRA_PLANAR) |
| 1 | Intra-DC (INTRA_DC) |
| 2 . . . , 34 | intra-angular 2 . . . , intra-angular 34 (INTRA_ANGULAR2 . . . , INTRA_ANGULAR34) |

In intra-prediction, prediction is performed on a current processing block based on a derived prediction mode. A reference sample used for prediction and a detailed prediction method are different depending on a prediction mode. If a current block is an intra-prediction mode, the decoder derives the prediction mode of a current block in order to perform prediction.

The decoder checks whether neighboring samples of the current processing block can be used for prediction and constructs reference samples to be used for the prediction (S502).

In intra-prediction, neighboring samples of the current processing block mean a sample neighboring the left boundary of current processing block of an nS×nS size, a total of 2×nS samples neighboring a bottom left of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been coded or may not be available. In this case, the decoder may construct reference samples to be used for prediction by substituting unavailable samples with available samples.

The decoder may perform filtering on the reference samples based on the intra-prediction mode (S503).

Whether or not to perform the filtering of the reference samples may be determined based on the size of the current processing block. Furthermore, the filtering method for the reference samples may be determined based on a filtering flag transferred by the encoder.

The decoder generates a prediction block for the current processing block based on the intra-prediction mode and the reference samples (S504). That is, the decoder generates a prediction block for the current processing block (i.e., generates a prediction sample within the current processing block) based on the intra-prediction mode derived in the intra-prediction mode derivation step (S501) and the reference samples obtained in the reference sample configuration step (S502) and the reference sample filtering step (S503).

If a current processing block has been encoded in the INTRA_DC mode, in order to minimize the discontinuity of the boundary between processing blocks, a left boundary sample (i.e., a sample within a prediction block neighboring a left boundary) and top boundary sample (i.e., a sample within a prediction block neighboring a top boundary) of the prediction block may be filtered at step S504.

Furthermore, at step S504, with respect to the vertical mode and horizontal mode of intra-angular prediction modes, as in the INTRA_DC mode, filtering may be applied to a left boundary sample or a top boundary sample.

More specifically, if a current processing block has been encoded in the vertical mode or horizontal mode, a value of a prediction sample may be derived based on a value of a reference sample positioned in the prediction direction. In this case, a boundary sample not positioned in the prediction direction among a left boundary sample or top boundary sample of a prediction block may neighbor a reference sample not used for prediction. That is, the distance from a reference sample not used for prediction may be much closer than the distance from a reference sample used for prediction.

Accordingly, the decoder may adaptively apply filtering to left boundary samples or top boundary samples depending on whether an intra-prediction direction is a vertical direction or a horizontal direction. That is, the decoder may apply filtering to left boundary samples if the intra-prediction direction is a vertical direction, and may apply filtering to top boundary samples if the intra-prediction direction is a horizontal direction.

In this case, the existing intra-prediction method generates a predictive sample value for the current block by using a neighboring sample (a sample neighboring to the top of the current block or a sample neighboring to the left of the current block). After generating the prediction sample value, the generated prediction sample value is copied according to the angular of the intra-prediction mode of the current block.

In encoding/decoding according to the intra-prediction mode, since the generated prediction sample value is simply copied, a problem of reducing the accuracy of prediction occurs as the distance from the reference samples increases. That is, the prediction accuracy is high when the distance between the reference samples and the prediction sample used for prediction is close, but the prediction accuracy is low when the distance between the reference samples and the prediction sample used for prediction is far. In order to improve the above problem, a method for generating a prediction sample for the current block by linearly interpolating a plurality of neighboring reference samples in the intra-prediction mode may be applied.

The method proposed in the present specification may be applied to various prediction methods including an existing intra-prediction method using only one existing reference sample, and in particular, may be applied to several intra-prediction methods generating a prediction sample by referring to two or more reference samples.

Hereinafter, a linear interpolation intra-prediction method will be described as an example of a prediction method for generating a prediction sample with reference to a plurality of reference samples to which the present disclosure can be applied.

FIG. 7 is a diagram for describing a linear interpolation prediction method as an embodiment to which the present disclosure may be applied.

Referring to FIG. 7, the encoder/decoder may derive (or induce) a first predictive sample P 701 value and a second predictive sample P' 702 value using neighboring samples of the current block, and linearly interpolate the derived first predictive sample P 701 value and second predictive sample P' 702 value to generate the prediction sample for the current block.

In detail, the first prediction sample P 701 value may be derived by the method described above with reference to FIGS. 5 and 6. The encoder/decoder may derive the intra-prediction mode of the current block, check whether neighboring samples of the current block can be used for prediction, and configure the reference samples used for the prediction.

If some of the neighboring samples of the current block have not yet been decoded or available, the encoder/decoder may substitute the samples that are not available with the available samples to configure the reference samples to be used for prediction, and may filter the reference sample based on the intra-prediction mode.

The encoder/decoder may derive the first prediction sample P 701 value based on the intra-prediction mode and the reference samples. That is, the encoder/decoder may determines an A reference sample and a B reference sample according to the direction and angle of the intra-prediction mode of the current sample C 703, and linearly interpolates the A reference sample and the B reference sample to derive the first prediction sample value P 701.

The encoder/decoder may determine the value of the second prediction sample P' 702 for linear interpolation based on the angular and angle of the intra-prediction mode. The encoder/decoder may determines the A' reference sample and the B' reference sample according to the direction and angle of the intra-prediction mode of the current block, and linearly interpolates an A' reference sample and a B' reference sample to derive the second prediction sample value P' 702.

The encoder/decoder may determine a reference sample neighboring the current block determined according to the prediction of the intra-prediction mode as the second prediction sample value. As another example, the encoder/decoder may generate a lower right sample adjacent to a current block, determine the lower right sample as a reference sample for linear interpolation according to a prediction direction of the intra-prediction mode and as a second prediction sample value.

Further, in one embodiment, in all intra-prediction modes with directionality, the encoder/decoder may apply weights according to a vertical distance between the first prediction sample P 701 and the current sample C 703, a vertical distance between the second prediction sample P' 702 and the current sample, and a vertical distance between the second prediction sample P' 702 and the current sample C 703 and linearly interpolated (or weight-summed) the weights to generate a predicted sample of the current sample.

Hereinafter, a boundary filtering method for an intra-prediction block will be described.

After performing the intra-prediction, the encoder/decoder may apply a filter that mitigates a block boundary surface in order to reduce errors with neighboring samples already reconstructed. In the DC mode, since the prediction value is generated as the average value of the neighboring samples, the boundary surface of the prediction block may be highlighted when the error between the neighboring blocks is large.

In addition, even in the prediction mode mainly using one surface of the left top reference samples such as the vertical or horizontal mode and the diagonal mode, discontinuity may occur with the sample that is not referred to upon the prediction. To remove this discontinuity, the encoder/decoder may apply a smoothing filter between the reference sample and the prediction block.

In detail, the encoder/decoder may determine whether to apply the filter and the type of the filter according to the predicted mode and the size of the block. In DC, horizontal and vertical prediction modes, the present filter may not be applied when a size of one side of the prediction block is larger than 16. The filter may use a filter that is specifically defined for each bi-linear or linear based mode.

Filtering may be applied to all sides in contact with the reference sample (e.g. DC mode) and only on sides (left side of the block predicted in the vertical mode) that are in contact with samples that are not primarily referenced upon the prediction, and the like. In addition, the diagonal mode may be applied up to 4 pixels within the side in contact with the contact, and the peripheral mode and the DC, vertical, and horizontal modes may be applied up to 1 pixel deep. Examples of the boundary filtering method according to the prediction mode will be described.

FIG. 8 is a diagram illustrating an intra boundary filtering method according to a prediction mode according to an embodiment to which the present disclosure may be applied.

Referring to FIG. 8, it is assumed that a prediction mode applied to a current block is a horizontal diagonal mode (e.g., Nos. 2 prediction mode).

When the horizontal diagonal mode is applied to the current block, since only the left reference sample among the reference samples neighboring the current block may be used for intra-prediction, as shown in FIG. 8, the filter may be applied to the top four pixels (or pixel lines) of the prediction block generated based on the horizontal diagonal mode in consideration of the discontinuity of the top boundary.

FIG. 9 is a diagram illustrating an intra boundary filtering method according to a prediction mode according to an embodiment to which the present disclosure may be applied.

Referring to FIG. 9, it is assumed that a prediction mode applied to a current block is a vertical diagonal mode.

When the vertical diagonal mode is applied to the current block, since only the top reference sample among the reference samples neighboring the current block may be used for intra-prediction, as shown in FIG. 9, the filter may be applied to the left four pixels (or pixel lines) of the prediction block generated based on the vertical diagonal mode in consideration of the discontinuity of the left boundary.

FIG. 10 is a diagram illustrating an intra boundary filtering method according to a prediction mode according to an embodiment to which the present disclosure may be applied.

FIG. 10 assumes that a prediction mode applied to a current block is a prediction mode (that is, a vertical group mode) classified into a vertical group. Here, the vertical group mode may include a vertical mode and one or more prediction modes whose prediction directions are adjacent to the vertical mode.

When the vertical group mode is applied to the current block, since only the top reference sample among the reference samples neighboring the current block may be used for intra-prediction, as shown in FIG. 10, the filter may be applied to the left one pixel (or pixel line) of the prediction block generated based on the vertical group mode in consideration of the discontinuity of the left boundary.

FIG. 11 is a diagram illustrating an intra boundary filtering method according to a prediction mode according to an embodiment to which the present disclosure may be applied.

FIG. 11 assumes that a prediction mode applied to a current block is a prediction mode (that is, a horizontal group mode) classified into a horizontal group. Here, the horizontal group mode may include a horizontal mode and one or more prediction modes whose prediction directions are adjacent to the horizontal mode.

When the horizontal group mode is applied to the current block, since only the left reference sample among the reference samples neighboring the current block may be used for intra-prediction, as shown in FIG. 11, the filter may be applied to the top one pixel (or pixel line) of the prediction block generated based on the horizontal group mode in consideration of the discontinuity of the top boundary.

Recently, various intra-prediction methods for generating a prediction sample with reference to two or more reference samples have been discussed, unlike the existing intra-prediction method (or an intra-prediction method) using only one reference sample.

As described above, even in the case of applying a method for generating a prediction block by referring to two or more reference samples and applying a weight to each reference sample, if boundary filtering for intra-prediction is performed, an excessive smoothing process may be performed on the block boundary to reduce the accuracy of the prediction.

Accordingly, in order to solve the above problem, the present disclosure provides a method for adaptively determining whether to apply boundary filtering according to an intra-prediction mode.

In addition, the present disclosure provides a method for adaptively applying boundary filtering to a generated prediction block when generating a prediction block using two or more weighted reference samples.

As the method for generating a reference sample used for intra-prediction, there may be various methods such as a method for using an already decoded pixel as a reference sample and a method for generating a new reference sample using the decoded pixel and then referring to the generated reference sample (for example, a method for generating and referring to right bottom, right, and bottom reference samples). Regardless of the method for generating a reference sample, the method proposed in the present specification may be applied when referring to two or more reference samples.

FIG. 12 is a diagram for describing an intra boundary filtering method according to the embodiment of the present disclosure.

Referring to FIG. 12, FIG. 12A illustrates an intra-prediction method referring to one reference sample, and FIG. 12B illustrates an intra-prediction method applying a weight with reference to two or more reference samples.

In the case of the prediction block generated in the intra-prediction mode (e.g., the vertical diagonal mode) for generating the prediction sample using the top reference sample as shown in FIG. 12A, the encoder/decoder may perform the boundary filtering as in the method above described with reference to FIG. 9.

However, in the case of the prediction block in which the prediction sample is generated by additionally using the left reference sample in the opposite direction (or the opposite boundary) based on FIG. 12B and the prediction direction, if the boundary filtering method is applied as shown in FIG. 9, additional smoothing may be performed and thus the prediction performance may be degraded due to excessive smoothing. In this case, the encoder/decoder may not apply boundary filtering to prevent this and to increase compression efficiency.

FIG. 13 is a diagram illustrating a method for adaptively applying boundary filtering according to an embodiment of the present disclosure.

Referring to FIG. 13, the encoder/decoder checks whether a current block refers to two or more reference samples (S1301). Whether to refer to two or more reference samples may mean whether to generate a prediction sample using reference samples positioned at both boundaries (i.e., different boundaries) based on the prediction direction of the prediction mode of the current block.

As a check result in step S1301, when the current block does not refer to two or more reference samples, the encoder/decoder performs boundary filtering on the current block (S1302). For example, the boundary filtering described above with reference to FIGS. 8 to 11 may be applied. However, the present disclosure is not limited thereto, and various known intra boundary filtering methods may be applied in addition to the boundary filtering method described above.

As a check result in step S1301, when the current block refers to two or more reference samples, the encoder/decoder does not perform boundary filtering on the current block. In other words, the encoder/decoder may skip the boundary filtering when the current block refers to two or more reference samples. This prevents the effect of applying the smoothing filter repeatedly.

FIG. 14 is a diagram illustrating a method for adaptively applying boundary filtering according to an embodiment of the present disclosure.

Referring to FIG. 14, the encoder/decoder checks whether unequal weighted prediction is applied to the current block (S1401). The unequal weighted prediction method represents a method for generating a prediction sample by applying different weights to a plurality of reference samples in the directional prediction mode. For example, the encoder/decoder may check whether the angle of the prediction mode applied to the current block is the angle at which the unequal weighted prediction is applied.

As a check result in step S1301, when the unequal weighted prediction is not applied to the current block, the encoder/decoder performs the boundary filtering on the current block (S1402). For example, the boundary filtering described above with reference to FIGS. 8 to 11 may be applied. However, the present disclosure is not limited thereto, and various known intra boundary filtering methods may be applied in addition to the boundary filtering method described above.

As a check result in step S1401, when the unequal weighted prediction is applied to the current block, the encoder/decoder does not perform the boundary filtering on the current block. In other words, the encoder/decoder may skip the boundary filtering when the unequal weighted prediction is applied to the current block. This prevents the effect of applying the smoothing filter repeatedly.

FIG. 15 is a diagram illustrating an intra-prediction mode based linear interpolation prediction method according to an embodiment of the present disclosure.

The encoder/decoder derives a prediction mode applied to intra prediction of the current block (S1501).

The encoder/decoder determines whether bi-directional intra-prediction using reference samples located on both sides of the current block based on the prediction direction of the prediction mode is applied to the current block (S1502).

The encoder/decoder generates a prediction sample using neighboring reference samples based on the prediction mode applied to the current block (S1503).

As described above, when bi-directional intra prediction is applied to the current block, the encoder/decoder may skip the boundary filtering on the current block If the bi-directional intra prediction is applied to the current block, the encoder/decoder may derive the first reference sample and the second reference sample used for the bi-directional intra prediction based on the prediction direction of the prediction mode. The encoder/decoder may generate a prediction sample by weighting-sum the first reference sample and the second reference sample.

In this case, a weight applied to each of the first reference sample and the second reference sample may be determined in proportion to the distance from the current pixel in the current block. Here, the distance from the current pixel may be a straight line distance as in the example above described with reference to FIG. 7, or may be a vertical distance or a horizontal distance.

In addition, when bi-directional intra prediction is not applied to the current block, the encoder/decoder may apply uni-directional intra prediction using one reference sample to the current block.

As described above with reference to FIGS. 8 to 11, when the bi-directional intra prediction is not applied, that is, when the uni-directional intra prediction is applied, the encoder/decoder may use at least one horizontal or vertical pixel line in the current block determined according to the prediction direction of the prediction mode to perform the boundary filtering on the current block.

FIG. 16 is a diagram illustrating in detail an intra-prediction unit according to an embodiment of the present disclosure.

In FIG. 16, the intra-prediction unit is illustrated as one block for convenience of description, but the intra-prediction unit may be implemented in a configuration included in the encoder and/or the decoder.

Referring to FIG. 16, the intra-prediction unit implements the functions, processes, and/or methods above proposed in FIGS. 7 to 15. In detail, the intra-prediction unit may be configured to include a prediction mode induction unit 1601, a bi-directional intra prediction determination unit 1602, and a prediction sample generator 1603.

The prediction mode induction unit 1601 derives a prediction mode applied to intra prediction of the current block.

The bi-directional intra prediction determiner 1602 determines whether bi-directional intra-prediction using reference samples located on both sides of the current block based on the prediction direction of the prediction mode is applied to the current block.

The prediction sample generation unit 1603 generates a prediction sample using neighboring reference samples based on the prediction mode applied to the current block.

As described above, when the bi-directional intra prediction is applied to the current block, the encoder/decoder may skip the boundary filtering on the current block If the bi-directional intra prediction is applied to the current block, the prediction sample generation unit 1603 may derive the first reference sample and the second reference sample used for the bi-directional intra prediction based on the prediction direction of the prediction mode. The prediction sample generation unit 1603 may generate a prediction sample by weighting-sum the first reference sample and the second reference sample.

In this case, a weight applied to each of the first reference sample and the second reference sample may be determined in proportion to the distance from the current pixel in the current block. Here, the distance from the current pixel may be a straight line distance as in the example described with reference to FIG. 7, or may be a vertical distance or a horizontal distance.

In addition, when bi-directional intra prediction is not applied to the current block, the encoder/decoder may apply uni-directional intra prediction using one reference sample to the current block.

As described above with reference to FIGS. 8 to 11, when the bi-directional intra prediction is not applied, that is, when the uni-directional intra prediction is applied, the encoder/decoder may use at least one horizontal or vertical pixel line in the current block determined according to the prediction direction of the prediction mode to perform the boundary filtering on the current block.

In the exemplary embodiments described hereinabove, components and features of the present disclosure were combined with each other in a predetermined form. Each component or feature should be considered as being selective unless being explicitly described separately. The respective components or features may be implemented in a form in which they are not combined with other components or features. In addition, some components and/or features may be combined with each other to configure the exemplary embodiment of the present disclosure. A sequence of operations described in the exemplary embodiments of the present disclosure may be changed. Some components or features of any exemplary embodiment may be included in another exemplary embodiment or be replaced by corresponding components or features of another exemplary embodiment. It is obvious that claims that do not have an explicitly referred relationship in the claims may be combined with each other to configure an exemplary embodiment or be included in new claims by amendment after application.

Embodiments of the present disclosure may be implemented by various means, for example, hardware, firmware, software, or a combination thereof, etc. In the case in which an exemplary embodiment of the present disclosure is implemented by the hardware, it may be implemented by one or more application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, a TV, a set-top box, a computer, a PC, a mobile phone, a smartphone, and the like.

In the case in which one embodiment of the present disclosure is implemented by the firmware or the software, it may be implemented in a form of a module, a procedure, a function, or the like, performing the functions or the operations described above. A software code may be stored in a memory unit and be driven by a processor. The memory unit is disposed in or out the processor and may transmit and receive data to and from the well-known various means.

It is obvious to those skilled in the art that the present disclosure may be embodied in another specific form without departing from the feature of the present disclosure. Therefore, the above-mentioned detailed description is to be interpreted as being illustrative rather than being restrictive in all aspects. The scope of the present disclosure is to be determined by reasonable interpretation of the claims, and all modifications within an equivalent range of the present disclosure fall in the scope of the present disclosure.

INDUSTRIAL APPLICABILITY

As mentioned above, preferred embodiments of the present disclosure are disclosed for the purpose of illustration, and those skilled in the art will be able to improve, change, substitute, or add various other embodiments within the spirit and scope of the present disclosure disclosed in the appended claims.

The invention claimed is:

1. A method for processing an image based on an intra-prediction mode by an apparatus, comprising:
   deriving the intra prediction mode applied to an intra prediction of a current block;
   determining whether unequal weighted prediction generating a prediction sample by applying different weights to a plurality of reference samples based on the intra-prediction mode is applied to the current block; and
   generating a prediction sample by weighting two or more reference samples of reference samples neighboring the current block based on the intra-prediction mode,
   wherein the step of determining checks whether a prediction direction of the intra-prediction mode applied to the current block corresponds to one of predetermined angles at which the unequal weighted prediction is applied, and
   wherein whether to apply filtering on the prediction sample of the current block is determined based on whether to apply the unequal weighted prediction to the current block such that the filtering is applied when the unequal weighted prediction is not applied and the filtering is not applied when the unequal weighted prediction is applied.

2. The method of claim 1, wherein the step of generating includes:
   deriving a first reference sample and a second reference sample used for the unequal weighted prediction based on the prediction direction of the intra-prediction mode when the unequal weighted prediction is applied; and
   generating the prediction sample by weighting-sum the first reference sample and the second reference sample.

3. The method of claim 2, wherein a weight applied to the first reference sample and the second reference sample, respectively, is determined in proportion to a distance from a current pixel.

4. The method of claim 2, wherein when the unequal weighted prediction is not applied, uni-directional intra prediction using one reference sample is applied to the current block.

5. The method of claim 1, further comprising:
   performing boundary filtering on the current block by using at least one horizontal or vertical pixel line in the current block determined according to the prediction direction of the intra-prediction mode when the unequal weighted prediction is not applied.

6. An apparatus for processing an image based on an intra-prediction mode, comprising:
   a prediction mode deriving unit configured to derive the intra-prediction mode applied to an intra prediction of a current block;
   a bi-directional intra-prediction determination unit configured to determine whether unequal weighted prediction representing a mode of generating a prediction sample by applying different weights to a plurality of reference samples based on the intra-prediction mode is applied to the current block; and
   a prediction sample generation unit configured to generate a prediction sample by weighting two or more reference samples of using a reference samples neighboring the current block based on the intra-prediction mode,
   wherein the bi-directional intra-prediction determination unit is configured to check whether a prediction direction of the intra-prediction mode applied to the current block corresponds to one of predetermined angles at which the unequal weighted prediction is applied, and
   wherein whether to apply filtering on the prediction sample of the current block is determined based on whether to apply the unequal weighted prediction to the current block such that the filtering is applied when the unequal weighted prediction is not applied and the filtering is not applied when the unequal weighted prediction is applied.

7. The apparatus of claim 6, wherein the prediction sample generation unit induces a first reference sample and a second reference sample used for the unequal weighted prediction based on the prediction direction of the intra-prediction mode when the unequal weighted prediction is applied, and generates the prediction sample by weighting-sum the first reference sample and the second reference sample.

8. The apparatus of claim 7, wherein a weight applied to the first reference sample and the second reference sample, respectively, is determined in proportion to a distance from a current pixel.

9. The apparatus of claim 7, wherein when the unequal weighted prediction is not applied, uni-directional intra prediction using one reference sample is applied to the current block.

10. The apparatus of claim 6, further comprising:

a boundary filtering unit configured to perform boundary filtering on the current block by using at least one horizontal or vertical pixel line in the current block determined according to the prediction direction of the intra-prediction mode when the unequal weighted prediction is not applied.

* * * * *